Figure 1:
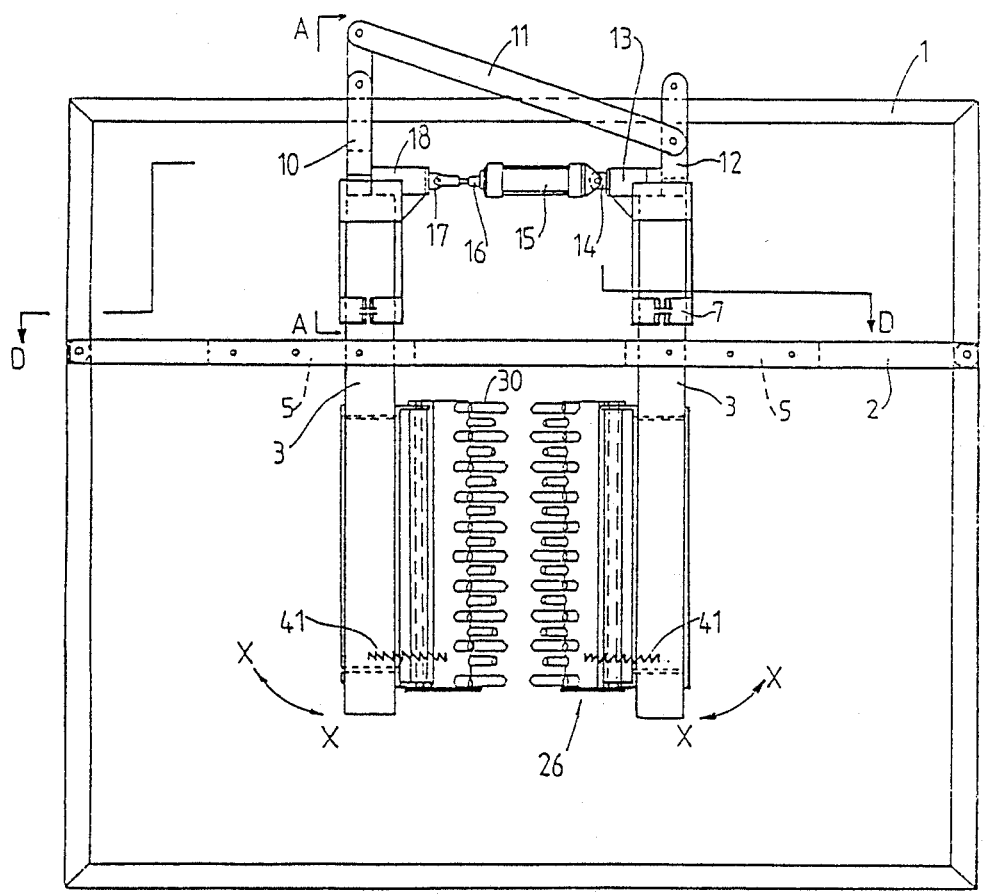

United States Patent [19]

Winsloe

[11] Patent Number: 4,747,184
[45] Date of Patent: May 31, 1988

[54] ANIMAL STUNNING EQUIPMENT

[75] Inventor: Ronald M. Winsloe, Invercargill, New Zealand

[73] Assignee: Alliance Freezing Company (Southland) Limited, Ocean Beach, New Zealand

[21] Appl. No.: 934,455

[22] Filed: Nov. 24, 1986

[30] Foreign Application Priority Data

Nov. 25, 1986 [NZ] New Zealand .......................... 214315

[51] Int. Cl.⁴ .............................................. A22B 3/06
[52] U.S. Cl. ..................................................... 17/1 E
[58] Field of Search ........................................... 17/1 E

[56]  References Cited

U.S. PATENT DOCUMENTS

| | | | |
|---|---|---|---|
| 1,935,138 | 11/1933 | Windisch | 17/1 E |
| 3,996,644 | 12/1976 | Andersson | 17/1 E X |
| 4,578,841 | 4/1986 | Nijhuis | 17/1 E |
| 4,586,214 | 5/1986 | Grajoszex | 17/1 E |

FOREIGN PATENT DOCUMENTS 8201607 11/1983 Netherlands .......................... 17/1 E Primary Examiner—Willie G. Abercrombie
Attorney, Agent, or Firm—Young & Thompson

[57]  ABSTRACT

Animal stunning equipment suitable for use with sheep or other small livestock includes a restrainer-conveyor (36) comprising one or more pair of continuous belt or slat conveyors having inclined operating surfaces facing each other to define a substantially V-shaped passageway in which an animal can be restrained and conveyed towards automatic stunning means. The stunning means is arranged so that one or more sets of electrodes (30) which are moveable between a stunning position and a withdrawn position, are set at rest to form a barrier in the path of the moving animal to stun the animal immediately it comes into contact with the waiting electrodes. The conveyor is temporarily stopped when the animal contacts the electrodes. After stunning has occurred, the electrodes are de-activated and moved to the withdrawn position of the conveyor path to enable the conveyor to be restarted and eject the stunned animal.

6 Claims, 9 Drawing Sheets

ANIMAL STUNNING EQUIPMENT

This invention relates to animal stunning equipment.

Animal stunning equipment is required to stun an animal prior to slaughter. To the present time such stunning equipment has generally included a conveyor which conveys an animal to a particular stunning position at which point the stunning electrodes will close onto a portion of the animal and grip it before releasing again to let the stunned animal through. Such a system is described in NZ Patent No. 201402.

Problems have been experienced with such stunning equipment in synchronising the arrival of the animal at the stunning position with the closing of the electrodes.

Problems have also been experienced with such stunning equipment, particularly when used on horned stock, with the electrodes failing to make proper contact with the animal, or becoming entangled with the animal.

Other examples of prior art stunners are shown in:
U.S. Pat. No. 4,361,932 Nijhuis
U.S. Pat. No. 3,996,644 Anderson
U.S. Pat. No. 4,468,837 Nijhuis Nijhuis has suggested moving the electrodes with the animal (e.g. a pig) as it moves along a restrainer conveyor or arranging the electrodes overhead to pivot out of the way as the animal moves through the stunner zone. Anderson teaches the holding of an animal captive in a pen then moving a conical stunner into contact with the animal's head. To move the electrodes towards a stationary animal or move it with a moving animal is unsatisfactory as it requires accurate contact between the animal and the electrodes.

It is an object of the present invention to provide stunning equipment which can overcome or at least obviate disadvantages with stunning equipment available to the present time and which can ensure that the stunning electrodes are in position for contact with the animal.

Further objects of this invention will become apparent from the following description.

According to one aspect of the present invention there is thus provided stunning apparatus, including one or more sets of electrodes which are moveable between a stunning position and a withdrawn position for use with transport means, whereby an animal may be moved into stunning contact with said electrodes when said electrodes are at rest at said stunning position, and wherein in use said electrodes may move out of said stunning position, out of contact with said animal, and into said withdrawn position.

According to another aspect of the present invention there is thus provided animal stunning apparatus comprising sets of electrodes, said sets of electrodes being in use positioned substantially in an animal stunning position prior to the arrival of an animal at said position.

Preferably said sets of electrodes included a pair of sets of electrodes which in normal use, when at rest at said stunning position, have electrically conductive contact points disposed across a line of approach of said animal, some of said contact points facing substantially into said line of approach, others of said contact points facing substantially across said line of approach.

Figure 2:
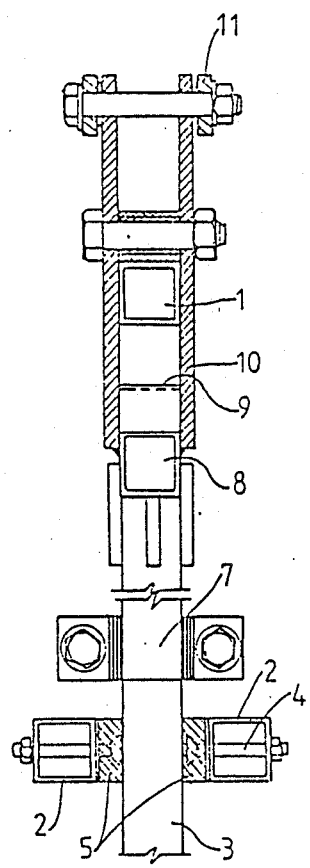
Figure 3:
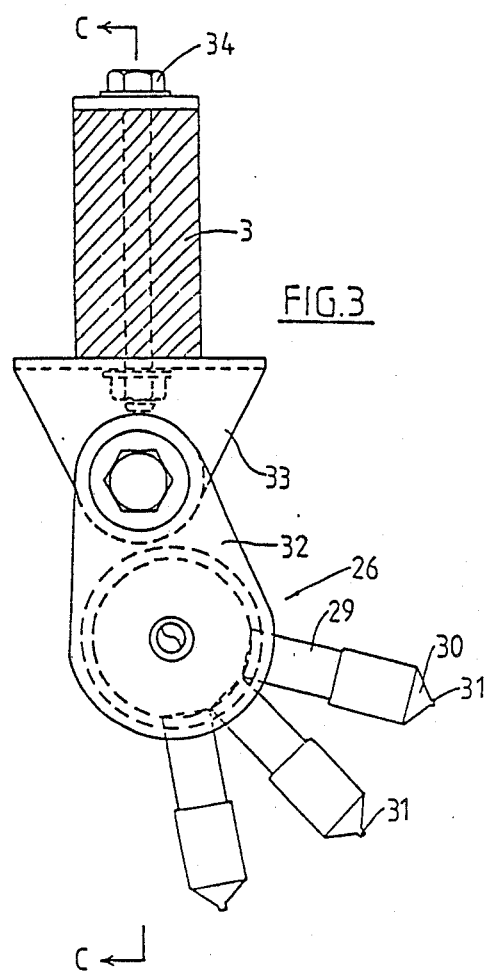
Figure 4:
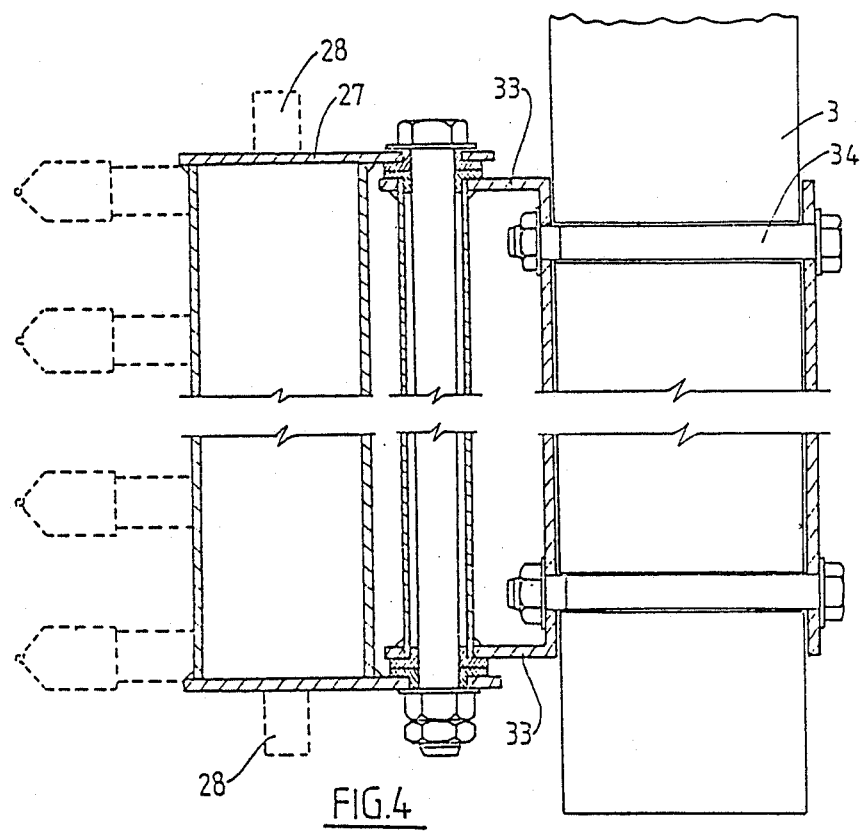
Figure 5:
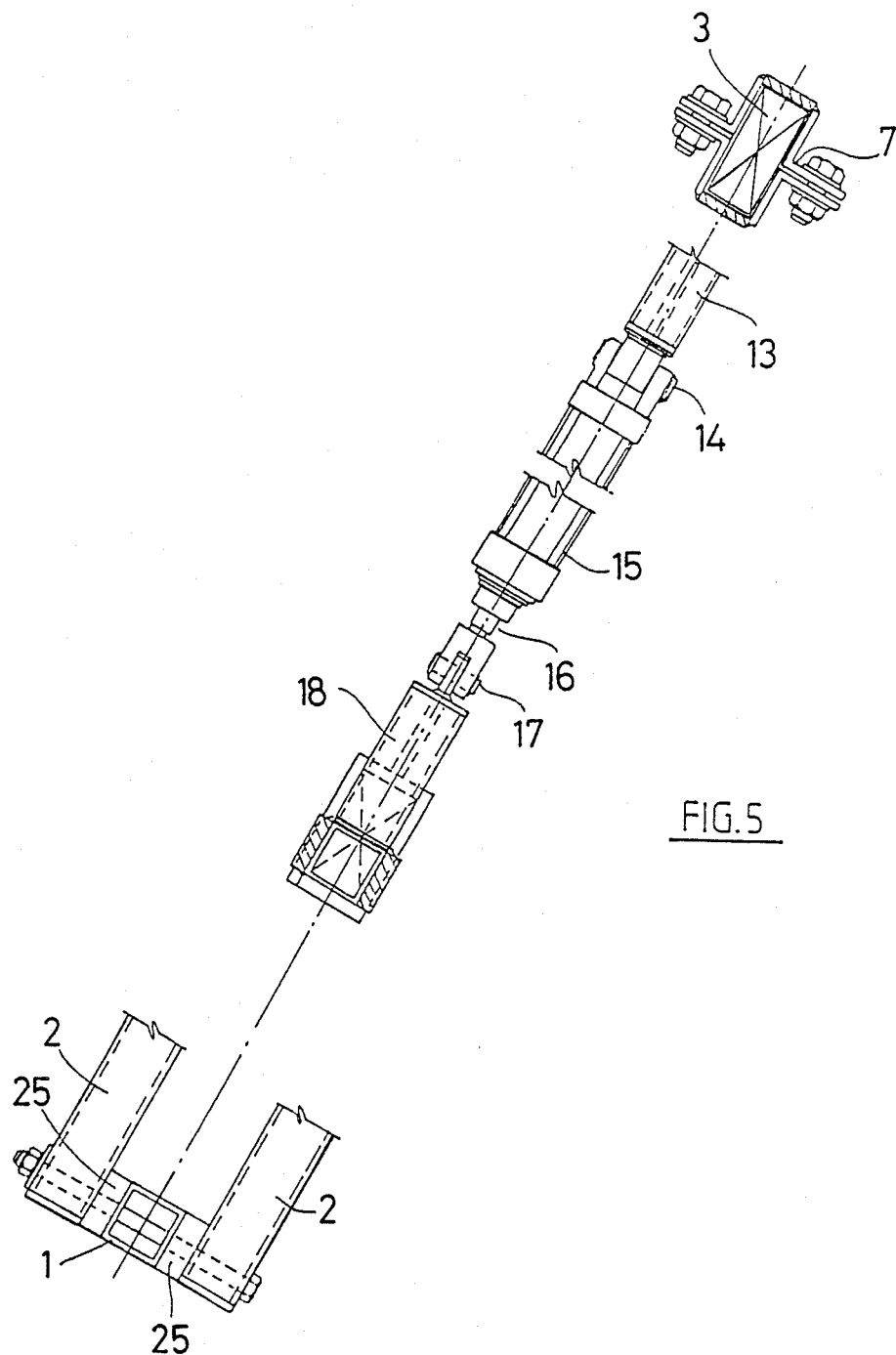
Figure 6:
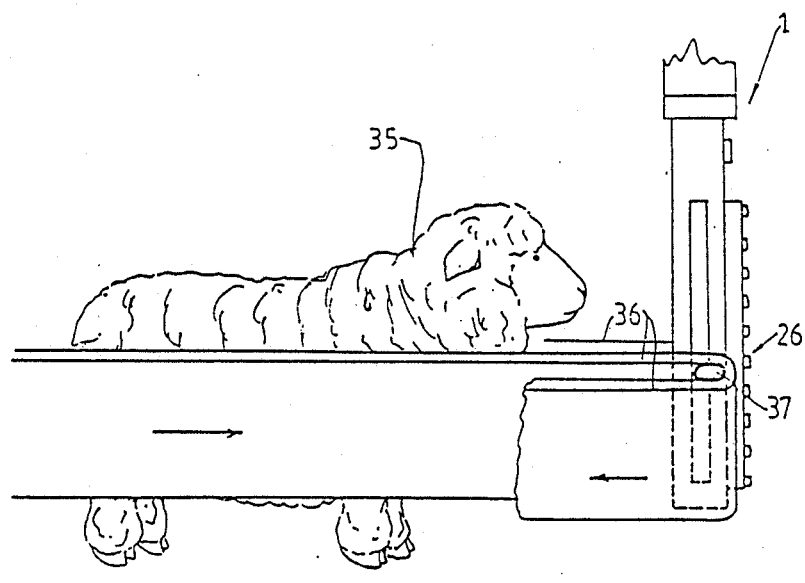
Figure 7:
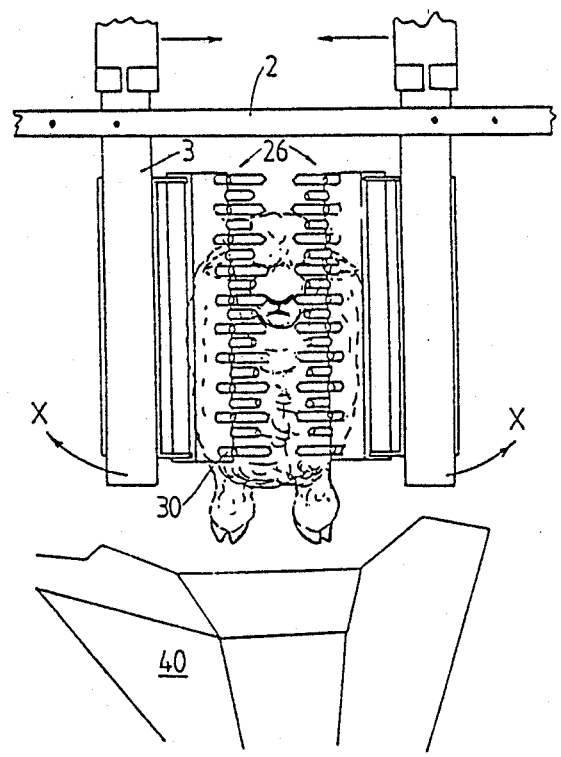
Figure 8:
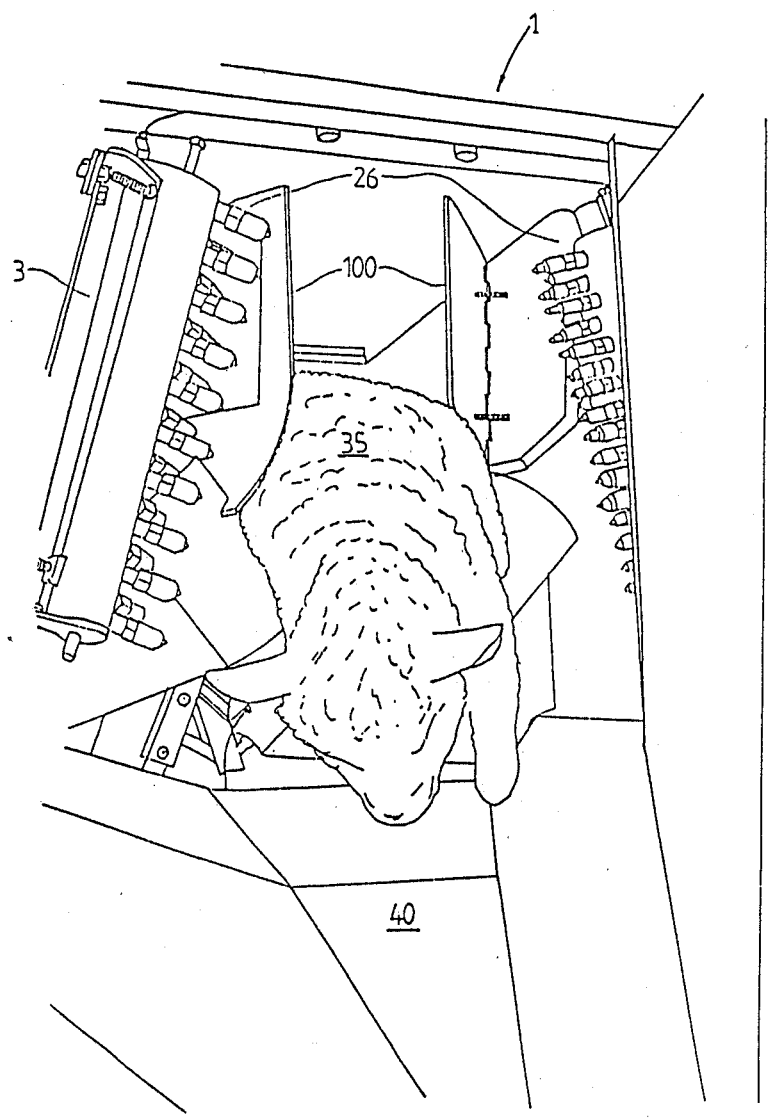
Figure 9:
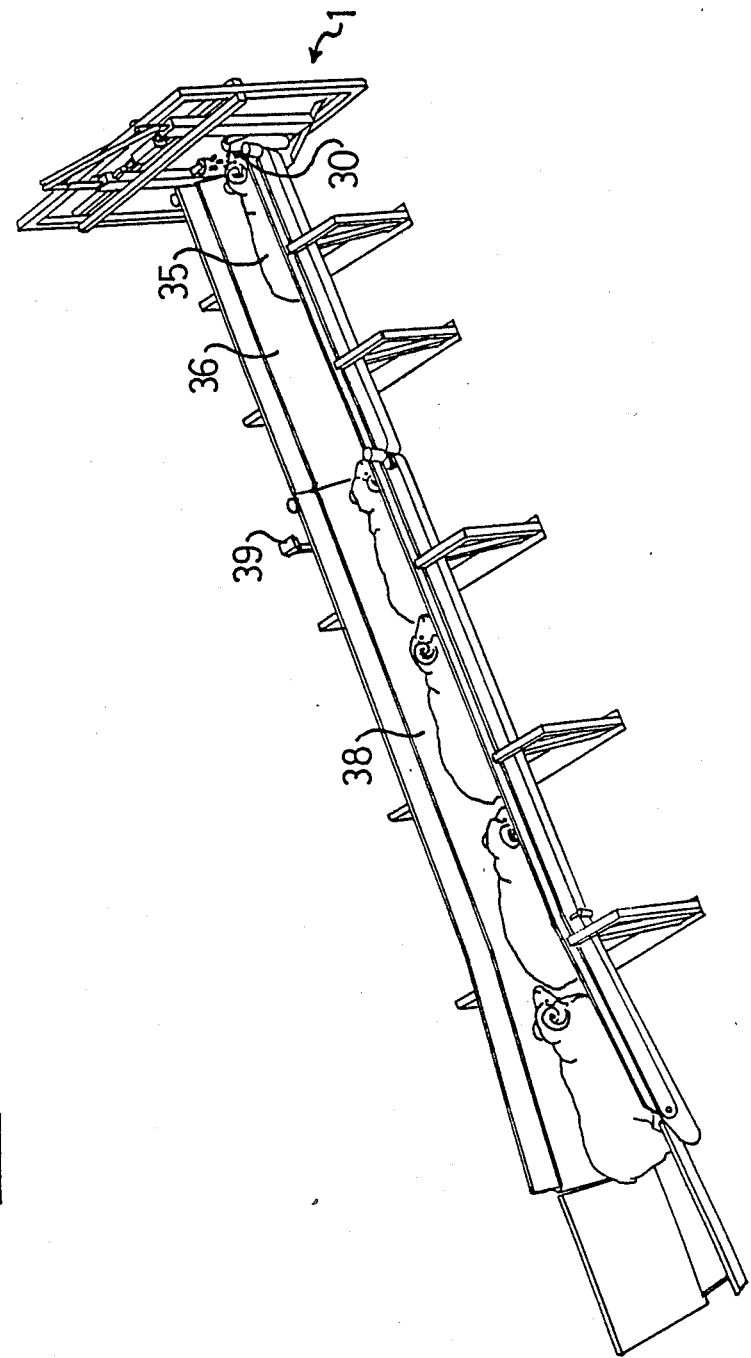

Further aspects of this invention which should be considered in all its novel aspects will become apparent from the following description given by way of example of a possible embodiment thereof and in which reference is made to the accompanying drawings wherein;

FIG. 1: shows diagrammatically a front perspective view of the animal stunning apparatus according to one possible embodiment of the invention;

FIG. 2: shows a cross-sectional view along arrow A—A of FIG. 1;

FIG. 3: shows a plan view of the right-hand stunning head of FIG. 1;

FIG. 4: shows a view along arrows C—C of FIG. 3;

FIG. 5: shows a plan view along arrows D—D of FIG. 1;

FIG. 6: shows very diagrammatically a sheep about to be carried into contact wtih the stunning electrodes;

FIG. 7: shows a view from the front of FIG. 6;

FIG. 8: shows an animal being discharged from the stunning apparatus after the stunning operation has been completed;

FIG. 9: shows transport apparatus of the present invention in perspective view.

The present invention relates broadly to an automatic stunning apparatus suitable for a variety of animal although of course changes in dimension, electrical voltage and the like may be needed as one progresses from the smallest animals up to the largest. In one particular size the apparatus may be used without any major modification or adjustment for a variety of animals including lambs, sheep, goats and pigs.

The present invention will now be described by way of example and with reference to the accompanying drawings.

The stunning apparatus is shown in FIGS. 1 and 2 particularly as including a support frame 1 having a pair of transverse guide members 2 between which are shown pivotally mounted by means of pins or bolts 4 a pair of spaced apart legs 3 which by this pivotal mounting are able to rotate in respective arcs as indicated by arrow X—X. The legs 3 are each suitably of an electrically non-conducting material such as a high strength plastics material e.g. "Tivar" (trade mark). A pair of wear strips 5 e.g. of plastics or the like are shown positioned on either side of the transverse guide 2 so as to reduce wear on the legs themselves as they open and close. The top of the left-hand leg 3 is shown in FIG. 2 being connected above the frame 1, with a link arm 11 by a clamp assembly 7 with a stub 8, end plate 9 and linkage 10. The link arm 11 is shown pivotally connected with a linkage 12, itself connected by means of a similar clamping assembly 7 with the right-hand leg 3. The linkage 12 is also shown connected, see FIG. 1 particularly, with an end plate 13 and via coupling 14 to a cylinder 15, the piston 16 of which is connected by coupling 17 with the end plate 18 connected to the linkage 10 of the left-hand leg 3.

This interconnection of the right and left-hand legs 3 may be seen particularly from the plan view shown in FIG. 5. FIG. 5 also illustrates the assembly at the left-hand side of the frame with the frame member 1, the pair of transverse guide members 2 and the spacing members 25 suitably of plastics or other suitably electrically insulating material.

Referring particularly now to FIGS. 3 and 4 of the accompanying drawings, the plan view of the right-hand stunning head of FIG. 1 is shown diagrammatically. The stunning head referenced generally by arrow 26 is seen to comprise a cylindrical pipe 27 with liquid, usually water, connections 28 at each end. Projecting from the pipe 27 are shown a plurality of electrodes 30.

The electrical conduction path will be enhanced by the water caused to flow through the nozzles 31.

The pipe 27 is shown having at each end thereof end plates 32 which connect the electrode assembly 26 by means of bracket 33 and support bolts 34 with the leg 3. The electrodes 30 are preferably splayed in a horizontal arc of approximately 90°, such that some project in use into the line of approach of an animal to be stunned, others project across the line of approach, and others project at intermediate angles. The spacing of the nozzles and electrodes 30, 31 along the vertical height of the pipe 27 is such as to ensure adequate stunning operation now being described.

As seen from FIGS. 6 and 7 particularly, an animal 35 such as a sheep can be conveyed to the stunning apparatus frame 1 by means of inclined V-belts 36 on either side of the animal 35, holding it off the ground with its own weight acting to restrain its movement. The belt 36 is shown as an endless conveyor passing around respective inclined rollers 37 on each side of the frame 1 adjacent the stunning heads 26.

Two sets of conveyors are preferably used, although the system might be used with a single pair of conveying belts 26. In the preferred arrangement, as shown particularly in FIG. 9, a comparatively long 'magazine' conveyor 38 leads onto the entrance of a shorter 'feed' conveyor 36, which carries the animal 35 to the stunning apparatus frame 1. The 'magazine' conveyor 38 runs at a slower speed than the 'feed' conveyor 36—for example, the conveyor 38 might carry an animal 35 at a speed fo 0.7 m/sec while the conveyor 36 carries the animal 35 at a speed of 0.8 m/sec. The difference in speed ensures that animals 35 approaching the stunning apparatus frame 1 are not in contact with each other as the leading animal is stunned. As an animal 35 moves onto the faster conveyor 36 from the end of the slower conveyor 38, it is pulled away from the animals 35 behind it, which are still moving forward at the slower speed of the conveyor 38. In practice a number of animals 35 may be 'stored' on the conveyor 38, and fed one at a time to the stunning apparatus by the faster conveyor 36.

A photo-cell detector 39 placed before the entrance of the 'feed' conveyor 36 may be used to control the amount of movement of the 'magazine' conveyor 38, such that when an animal 35 is 'called' and transported to the stunning apparatus, the the 'magazine' conveyor is also activated until the next animal in line is brought to this juncture and registered by the detector 39, whereupon the conveyor 38 stops.

For the slaughter of animals to be performed in accordance with the requirement of Halal killing, and also to fit in with contemporary abattoir procedures, it is necessary for no more than 10 seconds to elapse from the time an animal is called, through the stunning process, to sticking of the stunned animal. A two conveyor system, as described above, may make this possible, by having animals held in a 'magazine' ready for quick and efficient transport to the stunning apparatus, where a single conveyor system, into which animals are fed from a pen or run, might take too long.

When an animal 35 is called for, the legs 3 will close to the position shown in FIGS. 1 and 7. The animal will then be conveyed by means of the pair of conveyor belts 36 to the stunning frame 1. Once contact is established between the animal's head and the stunning electrodes 30, the conveyor 36 will be stopped and the stunning current will be given for a prescribed period.

Preferably the electric current is running in the electrodes from the moment the legs 3 have closed to the position particularly shown in FIGS. 1 and 7, ie. before the arrival of the animal 35, such that the stunning is initiated at contact of the animal 35 with the stunning electrodes 30, rather than after contact has been made.

Preferably also, movement of the conveyor belts 36 is halted by contact of the animal 35 with the stunning electrodes 30. This may be achieved by a small rotational movement of the electrode assembly 26 relative to the bracket 33, under pressure of the animal 35 being run into contact with the electrodes 30, which can be used to activate a limit switch, and thereby stop the conveyor. In this way proper contact between the animal 35 and the electrodes 30 may be ensured before movement of the conveyor will stop.

As seen in FIG. 8 particularly, once the stunning is completed the legs 3 will open and the conveyor 36 can advance sufficiently to eject the stunned animal out from the frame 1 to be received on the chute 40.

To ensure that the electrodes 30 make good physical contact with the animal's head the stunning heads 26 are suitably biased into the animal contact position. To this end springs 41 are shown by way of example connecting the pipes 27 and the legs 3 in FIG. 1 although of course other biasing means may be used as required.

It is thus seen that in the embodiment of the invention shown, controlled operation of the cylinder 15 or the like would ensure that the stunning heads 26 are in their closed position ready to receive an animal when it arrives at the stunning position. Furthermore, the biasing of the electrode heads 26 into their animal contacting position will ensure good physical contact with the animal's head, and the use of water in conjunction with the stunning will ensure good electrical contact.

Furthermore, by mounting the stunning heads 26 on an electrically nonconductive leg 3 suitably of a high strength plastics material, earth leakage current may be prevented.

If it is desirable for animals being processed to be killed by the apparatus, rather than simply stunned, it may be preferred to include a special electrode or set of electrodes for the purpose, rather than simply increasing the voltage of the electric current used, or using some other means to achieve this. In such a case the additional electrode is mounted centrally at the base of the frame 1, such that it may move upwards into a killing position simultaneous with closing of the legs 3. The killing position is one which causes the electrode in normal use to be contacted by the brisket or thorax region of an animal brought to the stunning apparatus, such that the current is directed to the heart of the animal, to kill it.

A central processing unit or other control equipment may be provided so as to synchronise the opening and closing of the legs 3, the movement of the conveyors 36 and 38 and the initiation and termination of the stunning current.

Control of the operation can be fairly simple, as many aspects of the process follow on, one from another, in a simple chain of events which do not require timing. The length of time for which the stunning current is running needs to be preset, and generally may extend for approximately one and a half seconds. The current flow may be monitored, and if found to be insufficient for some reason—possibly an animal's horns prevent proper contact—the conveyor 36 may be reversed a short way, perhaps for a period of one second, and brought forward again to re-establish contact between the animal and the stunning electrodes. With time periods of these lengths, three attempts at stunning may be made on an animal without the slaughtering process being disrupted.

Another operation requiring a preset time period is the short run forward by the conveyor 36 after release of a stunned animal by the apparatus, to discharge the animal on the chute 40.

The period of the entire cycle may also be automatically controlled with a preset time interval, determined by the speed at which subsequent operations in the slaughtering chain are performed. Preferably however the call for another animal to be stunned is given by an operator.

Movement of the conveyors does not need to be timed, as both are activated at once, the conveyor 38 is stopped by sensing of a new animal by the sensor 39, and the conveyor 36 is stopped by contact of an animal with the electrodes 30.

Biased centralising head flaps 100 may be provided which assist in ensuring that the head of the animal is presented to the electrodes 26 in the correct position. A further sprung flap (not shown) may also be mounted above flaps 100 to prevent the animal's head being lifted just prior to stunning. Furthermore, front and back limit stops (not shown) may suitably be provided so as to determine the travel of the legs 3 between their open and closed positions.

Where in the foregoing description reference has been made to specific components or integers of the invention having known equivalents then such equivalents are herein incorporated as if individually set forth.

Although this invention has been described by way of example and with reference to possible embodiments thereof it is to be understood that modification or improvements may be made thereto without departing from the scope or spirit of the invention, as defined in the following claims:

I claim:

1. Automatic stunning apparatus comprising:
   two sets of electrodes arranged as a pair,
   a frame in which said sets of electrodes are movably mounted,
   means for moving said sets of electrodes relative to said frame, between a stunning position and a withdrawn position,
   transport means capable of transporting an animal towards said frame and through said frame along a line of approach,
   said sets of electrodes each including an elongate array of electrically conductive contact elements, which when said sets of electrodes are at rest at said stunning position is oriented with the long axis of said elongate array extending substantially vertically and substantially parallel to the long axis of the other said elongate array,
   said elongate arrays of electrically conductive contact elements being arranged on opposite sides of said line of approach when said sets of electrodes are at rest at said stunning position, with said electrically conductive contact elements projecting transversely across said line of approach, forming an electrifiable barrier extending substantially completely across said line of approach, with which an animal transported by said transport means along said line of approach will in normal use make frontal face contact,
   wherein said means for moving said sets of electrodes relative to said frame can move said sets of electrodes substantially transversely relative to said line of approach away from each other to said withdrawn position, such that when said sets of electrodes are at rest at said withdrawn position, a gap is provided between said sets of electrodes, through which said transport means can move an animal without said animal contacting said electrically conductive contact elements.

2. Stunning apparatus as claimed in claim 1, wherein said sets of electrodes each further include electrically conductive contact elements which when said sets of electrodes are at rest at said stunning position project in a direction substantially parallel to said line of approach.

3. Stunning apparatus as claimed in claim 2, wherein said transport means includes a restrainer-conveyor comprising at least one pair of endless conveyors having inclined operating surfaces facing each other, said operating surfaces forming a substantially V-shaped passageway therebetween, said passageway forming said line of approach.

4. Stunning apparatus as claimed in claim 1, wherein said sets of electrodes are mounted for pivotal movement between said stunning position and said rest position, in a plane substantially transverse to said line of approach.

5. Stunning apparatus as claimed in claim 4, further including centralizing guides adjacent said stunning position adapted to direct said animal or parts thereof into a particular orientation at said stunning position, such that said animal makes frontal face contact with said electrically conductive contact elements.

6. Stunning apparatus as claimed in claim 5, wherein said guides comprise biased movably mounted members.

* * * * *